Nov. 27, 1928.

A. WILLEY 1,692,879

GROUND CHECKER

Filed Sept. 7, 1926

INVENTOR.
A. Willey

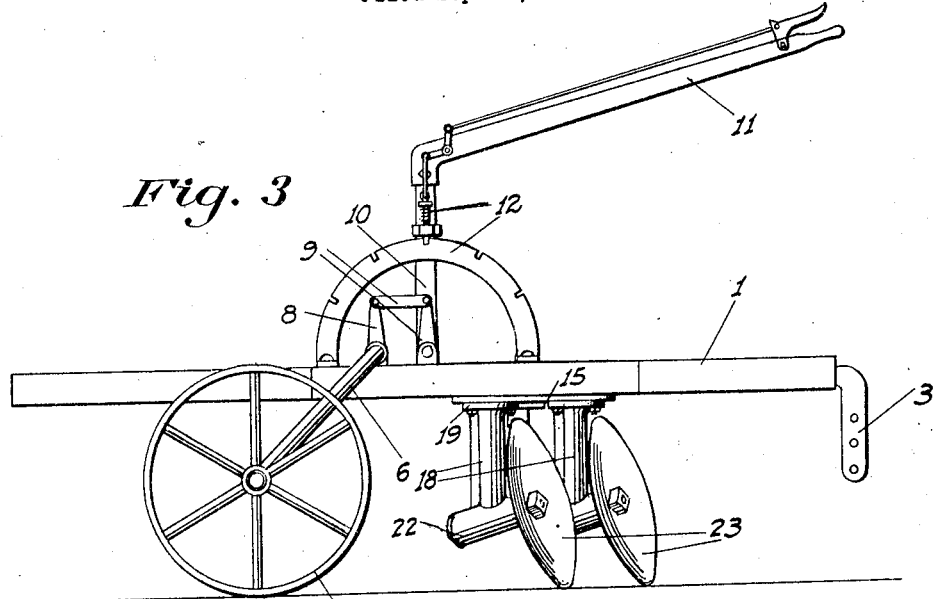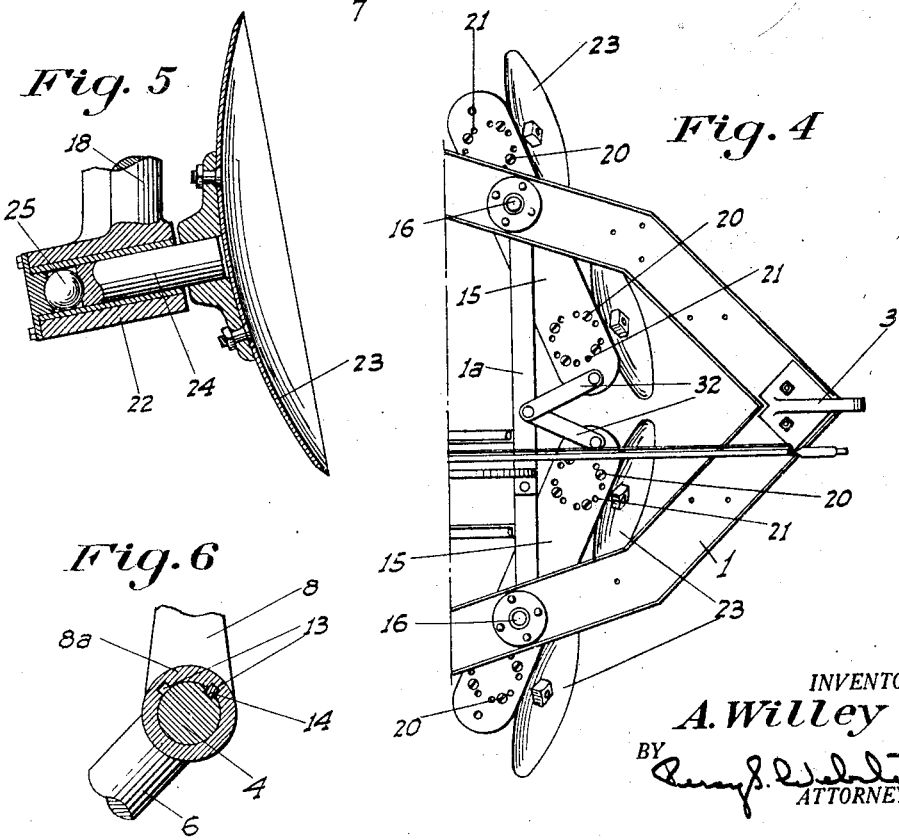

Patented Nov. 27, 1928.

1,692,879

UNITED STATES PATENT OFFICE.

ALONZO WILLEY, OF STOCKTON, CALIFORNIA.

GROUND CHECKER.

Application filed September 7, 1926. Serial No. 133,812.

This invention relates to improvements in agricultural implements, and particularly to one for checking the ground as is necessary in raising certain kinds of crops.

The principal object of my invention is to provide a device for the purpose to be drawn along the ground so constructed that when moving in one direction a check will be built up to any size desired within reason; and when pulling the implement in the other direction and upon making certain readjustment of the parts checks already in place will be cut away and the ground smoothed out.

After checks have been made in one direction, the making of cross checks causes the checks already made to be cut away and checks opened in the path of the checking members of the implement as the latter travels to make such cross checks.

A further object of my invention therefore is to provide a means arranged in connection with the implement for enabling one of said openings thus made to be filled in as the implement passes across the checks without halting the travel of the implement or the operation of the checking members.

A further object of the invention is to provide a device for the purpose which will be very efficient in operation and which can be readily manipulated by one man while operating.

These objects I accomplish by means of such structure and relative arrangement of parts as will fully appear by a perusal of the following specification and claims.

In the drawings similar characters of reference indicate corresponding parts in the several views:

Fig. 3 is a side elevation of the checker as arranged for leveling or tearing down checks.

Fig. 4 is a fragmentary top plan view of the device, as in Fig. 3.

Fig. 5 is a fragmentary sectional elevation showing the mounting of a checking disc in its support.

Fig. 6 is a fragmentary cross section of the wheel-supporting arm shaft and the operating arm therefor.

Figure 1:
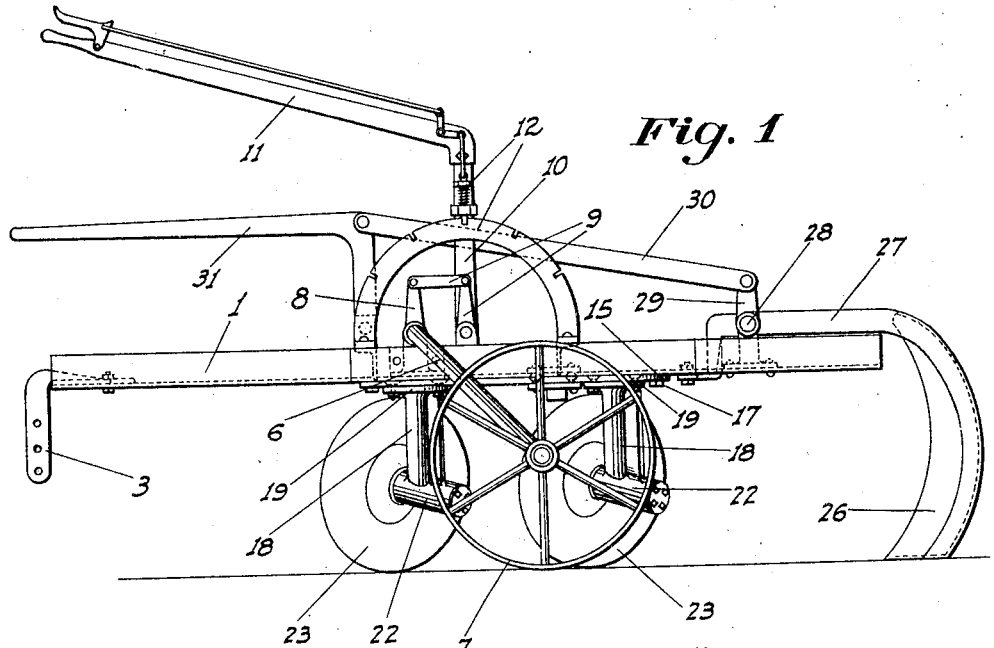
Fig. 1 is a side elevation of my improved checker shown as arranged for building up checks.
Figure 2:
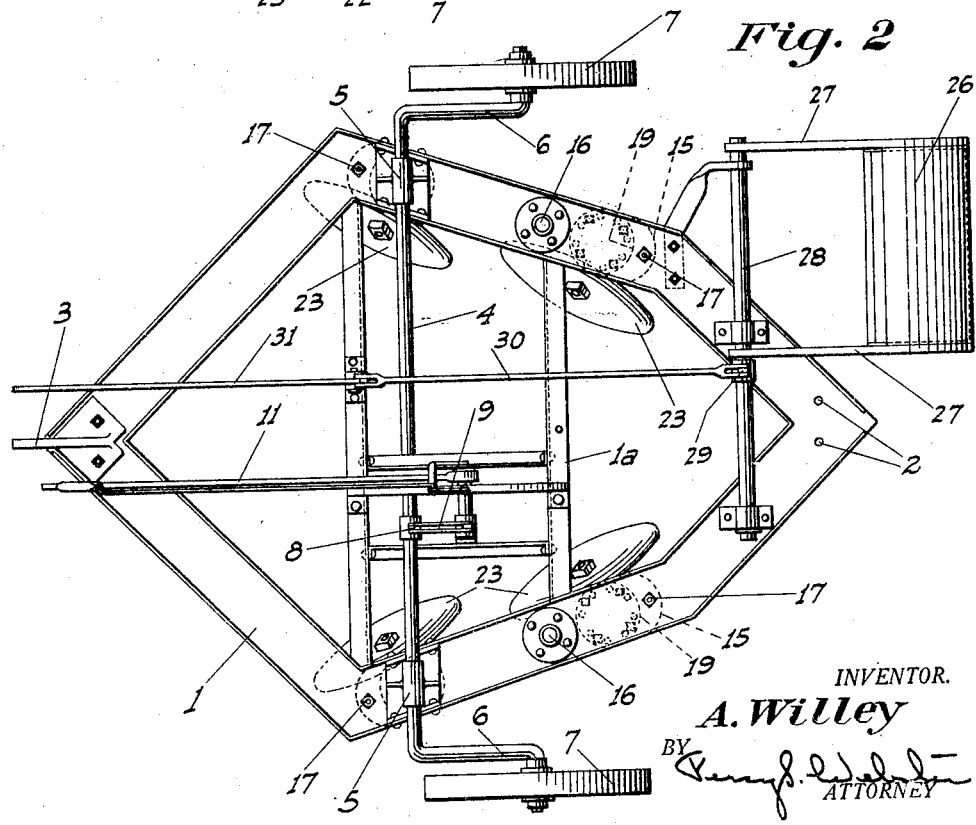
Fig. 2 is a plan view of the device as in Fig. 1.

Referring now more particularly to the characters of reference on the drawings, the numeral 1 denotes the frame of the implement of polygonal and symmetrical form relative to a longitudinal axis and pointed at both ends. The frame is preferably made of channel iron with the side webs facing upwardly. Holes 2 are drilled through the frame at both ends for enabling a drawbar member 3 to be connected at either end of the frame by removable bolts.

A transverse shaft 4 is turnable in bearing members 5 mounted on the frame; said shaft having downwardly depending arms 6 at its ends which support ground bearing wheels 7. An arm 8 projects upwardly from the shaft at a suitable point and is connected by suitable linkage 9 to an operating lever 10 pivoted on the frame structure. A substantially horizontal handle member 11 is rigidly and removably secured to the upper end of the lever 10. This handle member is reversible so that it may face either end of the frame, thus enabling the lever to be operated from either end of the implement depending on the direction of travel thereof. A pawl and quadrant mechanism of common character, indicated at 12, and associated with the lever handle and frame enables said lever and consequently the wheels to be held at any desired level and position. When the drawbar is at one end of the frame the arms 6 are intended to slant toward the other end and vice versa. In order to enable the setting of the arms to be readily reversed when reversing the direction of travel of the machine, and without shifting the position of the lever 10, the hub 8ª of the arm 8 is provided with a pair of keyways 13 spaced apart the necessary distance circumferentially to correspond to the reversal of angle of setting of the arms. A key 14 removably fits in either of the keyways and in a keyway in the shaft 4.

Disposed under the frame along the sides thereof are plates 15. Each plate is pivoted intermediate its ends onto said frame by a vertical pin 16, and in check making operations said plate is held alined with the frame by bolts 17 passed through the plate and frame at its ends. Depending from the plate at longitudinally spaced intervals are standards 18 having enlarged flanges 19 at their upper ends abutting against the plate 15 and secured thereto by bolts 20. The bolt holes 21 are arranged in a circle and there are a greater number of said holes than there are bolts so that the flanges may be turned to occupy different positions relative to the plate.

Projecting from each standard at the bottom thereof is a sleeve 22 having a slight upward slant as shown in Fig. 5. A ground engaging disc 23 is disposed beyond one end of the sleeve, with a spindle 24 turnable in said sleeve. To take the unavoidable thrust of the spindle with a minimum of friction and wear I mount a ball 25 in the sleeve against which the inner end of the spindle bears.

Each plate 15 preferably carries two discs which are spaced apart longitudinally and are disposed with a rear converging angle relative to the direction of movement of the implement, the discs on the two plates facing each other. It will therefore be seen that with such movement of the implement the ground engaged by the discs will be brought toward the center of the machine and piled up in the form of a check. By altering the angle of setting of the discs relative to the frame and plates the amount of ground acted on by said discs may be altered with a corresponding difference in the size of the check, as will be evident.

It will be seen that as the implement moves across any check already built, the discs will cut through and destroy such check in places and will form two spaced openings therein. One such opening may be left without any detrimental results for the water to flow through, but the other opening should be closed. I have therefore provided a means for enabling this closing operation to be carried out without halting the movement of the implement. This means comprises a scraping blade 26 extending transversely of the line of movement of the implement and disposed rearwardly of one pair of the discs and in the longitudinal plane of the swath cut thereby. This blade is connected to arms 27 which overhang the frame adjacent its rear end and which are fixed on a transverse shaft 28 suitably journaled on said frame. An arm 29 projects upwardly from the shaft, a link 30 extending forwardly from the arm to a control lever 31 which also extends forwardly to a point where it may be manipulated from a tractor or other draft means pulling the implement. This mechanism enables the scraping blade to be raised clear of the ground when its use is not necessary.

When the checks are to be leveled the drawbar 3 is placed at the rear end of the frame, and the wheels are reversed in position by the means previously described.

The scraping blade and associated parts may also be removed. The bolts 17 are likewise removed and the plates 15 are swung around on the pins 16 so that they project inwardly at an angle to the rear end of the frame, as shown in Fig. 4, and so that the discs then face away from each other. The plates are then held in this position by any suitable means such as links 32 connected to the adjacent or inner ends of the plates and to a cooperating beam 1ª of the frame.

With this position of the plates the innermost or adjacent pair of discs are disposed at a forward angle to each other relative to the direction of movement of the implement and face in such direction. They are thus in position to engage or level a check, the other discs taking some of the dirt as thrown by said inner discs, thus completing the leveling operations.

The depth to which the discs operate may be altered to suit by manipulation of the wheel controlling member 11.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A checking implement comprising a frame to be drawn along the ground, longitudinally arranged and oppositely disposed ground engaging members mounted under and connected to the frame, said members converging toward the rear end of the frame, an additional transverse ground engaging member mounted on the frame rearwardly of said longitudinal members and disposed in the longitudinal plane of the ground area engaged by one set of said members, and means for raising and lowering said transverse member at will.

2. A checking implement comprising a frame to be drawn along the ground, horizontal and longitudinally extending plates under the frame on opposite sides of the longitudinal center line thereof, ground engaging members depending from the plates in opposed relation to each other, and pivot connection means between the plates and the frame to enable the plates intermediate their ends to be reversed in position to correspondingly reverse the setting of said members relative to each other without disconnecting said plates from the frame.

3. A checking implement comprising a frame structure adapted to be drawn along the ground in either direction, ground engaging members mounted in connection with the frame, wheels supporting the frame, means for raising and lowering the wheels including a normally vertical lever portion, and a substantially horizontal lever portion reversibly mounted on said vertical portion.

4. A checking implement comprising a frame structure adapted to be drawn along the ground, ground engaging members mounted in connection with the frame, wheels for supporting the frame, arms projecting upwardly from the wheels, a transverse shaft on the frame to which the arms are secured, means for turning the shaft including a normally vertical arm, and means for securing the wheel arms to said vertical arm so that said wheel arms may depend in opposite longitudinal angular directions selectively without disturbing the vertical arm.

In testimony whereof I affix my signature.

ALONZO WILLEY.